(12) United States Patent
Fiumidinisi

(10) Patent No.: US 8,807,447 B2
(45) Date of Patent: Aug. 19, 2014

(54) COMBINED HEATING/HOT WATER SYSTEM FOR A VEHICLE

(75) Inventor: Alessandro Fiumidinisi, Pero (IT)

(73) Assignee: Webasto SE, Stockdorf (DE)

( * ) Notice: Subject to any disclaimer, the term of this patent is extended or adjusted under 35 U.S.C. 154(b) by 1266 days.

(21) Appl. No.: 12/279,667

(22) PCT Filed: Dec. 19, 2006

(86) PCT No.: PCT/DE2006/002277
§ 371 (c)(1), (2), (4) Date: Aug. 15, 2008

(87) PCT Pub. No.: WO2007/059877
PCT Pub. Date: Aug. 30, 2007

(65) Prior Publication Data
US 2009/0078784 A1 Mar. 26, 2009

(30) Foreign Application Priority Data
Feb. 20, 2006 (DE) .......................... 10 2006 007 777

(51) Int. Cl.
| | |
|---|---|
| *F24D 3/08* | (2006.01) |
| *B60H 1/22* | (2006.01) |
| *B60H 1/00* | (2006.01) |
| F24D 5/00 | (2006.01) |
| F24H 1/48 | (2006.01) |
| F24D 17/00 | (2006.01) |

(52) U.S. Cl.
CPC .............. *B60H 1/00364* (2013.01); *F24D 3/08* (2013.01); *F24D 5/00* (2013.01); *B60H 1/2225* (2013.01); *B60H 2001/00221* (2013.01)
USPC ............. 237/19; 237/12; 237/32; 237/12.3 A; 237/12.3 B; 165/41; 165/42

(58) Field of Classification Search
USPC ...... 237/32, 12.3 R, 12.3 A, 12.3 B, 12.4, 19, 237/28; 122/3; 165/41–43

IPC ................... F24D 3/08,5/00, 17/00; F24C 3/00, F24C 13/00; F24H 1/48
See application file for complete search history.

(56) References Cited

U.S. PATENT DOCUMENTS 2,403,186 A * 7/1946 Leslie ........................... 237/2 R
2,425,630 A * 8/1947 McCollum ................ 244/134 B
(Continued)

FOREIGN PATENT DOCUMENTS

DE          311 4560         11/1982
DE   20 2004 003914 U    5/2004

OTHER PUBLICATIONS

"DE 202004003914—Machine Trans.pdf"; European Patent Office. *

(Continued)

*Primary Examiner* — Kang Hu
*Assistant Examiner* — Daniel E Namay
(74) *Attorney, Agent, or Firm* — Fitch, Even, Tabin and Flannery, LLP

(57) ABSTRACT

Combined heating/hot water system (10) for a vehicle (12), comprising an air heating device (14), at least one air duct (20, 22, 24), by means of which the air heating device (14) is connected by air to an interior (30) of the vehicle (12) for heating, a fan (18), by means of which air heated in the air heating device (14) may be introduced into the interior (30) of the vehicle (12) for heating, a hot water reservoir (16) arranged in a recess (15) in the air heating device (14), a first pipe duct (36), by means of which the hot water reservoir (16) may be hydraulically connected to a tap (34) in the vehicle (12) and a second pipe duct (38), by means of which the hot water reservoir (16) is hydraulically coupled to a water tank (32), wherein at least one of the pipe ducts (36, 38) is arranged in one of the air ducts (20, 22, 24).

7 Claims, 3 Drawing Sheets

(56) References Cited

U.S. PATENT DOCUMENTS

Figure 1:
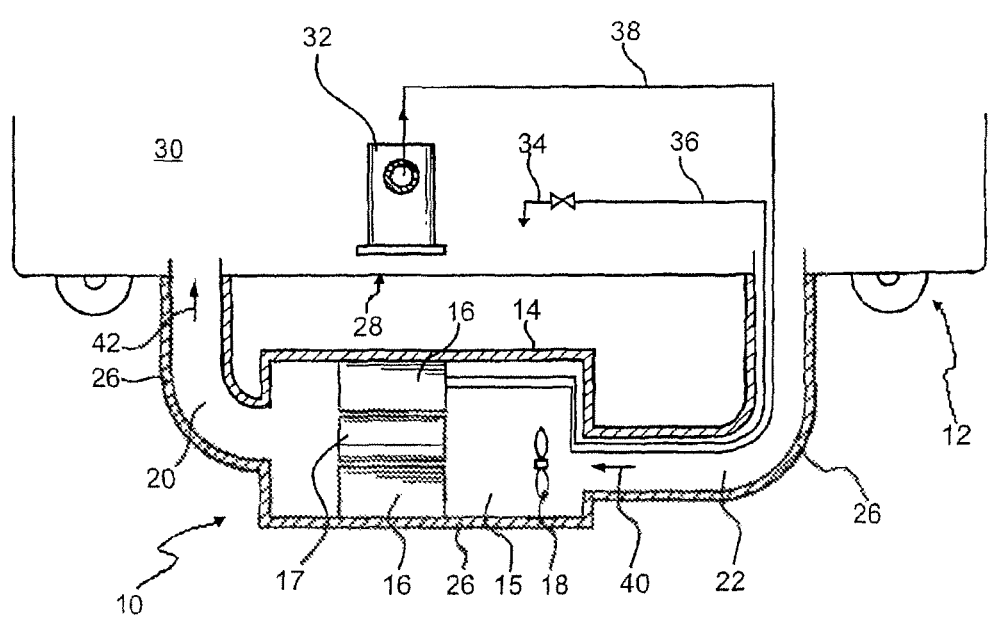

| | | | |
|---|---|---|---|
| 2,467,156 A * | 4/1949 | Sala | 165/73 |
| 2,482,735 A * | 9/1949 | Ritter et al. | 237/5 |
| 2,822,136 A | 2/1958 | Dalin | |
| 3,381,316 A * | 5/1968 | Anderson | 4/597 |
| 4,057,189 A * | 11/1977 | Shoemaker | 237/17 |
| 5,067,652 A * | 11/1991 | Enander | 237/81 |
| 5,299,329 A * | 4/1994 | Constantini | 4/597 |
| 5,544,645 A * | 8/1996 | Armijo et al. | 126/101 |
| 6,019,123 A * | 2/2000 | Gibbs | 137/338 |
| 6,109,339 A * | 8/2000 | Talbert et al. | 165/48.1 |
| 6,732,940 B2 * | 5/2004 | Enander et al. | 237/2 A |
| 6,899,124 B1 * | 5/2005 | Ward | 137/338 |
| 6,932,105 B1 * | 8/2005 | Ward | 137/338 |
| 7,007,857 B2 * | 3/2006 | Enander et al. | 237/12.3 B |
| 2003/0192954 A1 * | 10/2003 | Enander et al. | 237/12.3 B |
| 2004/0232251 A1 * | 11/2004 | Enander et al. | 237/12.3 B |
| 2006/0016401 A1 * | 1/2006 | Loving | 122/250 R |
| 2006/0196955 A1 * | 9/2006 | Moxon et al. | 237/34 |

OTHER PUBLICATIONS

"DE 202004003914—Machine Trans.pdf"; European Patent Office; Oct. 7, 2011.*

* cited by examiner

COMBINED HEATING/HOT WATER SYSTEM FOR A VEHICLE

This application is a 35 U.S.C. §371 National Stage entry of PCT/DE2006/002277, filed Dec. 19, 2006, which claims priority from German Patent Application No.: DE 10 2006 007 777.6, filed Feb. 20, 2006, the contents of which are herein incorporated by reference.

The invention relates to a combined heating/hot water system for a vehicle and a vehicle comprising a combined heating/hot water system.

Such combined heating/hot water systems may be used, for example, for heating and for supplying hot water for campervans, motorhomes, watercraft and the like.

Such a combined heating/hot water system for a vehicle is, for example, known from the German utility model DE 20 2004 003 914 U1. An air heater for heating an airflow, as required, is connected to an air-fluid-heat exchanger, via which heat may be discharged to a heat sink. The heat sink may, for example, be a system for water for domestic use. Thus a combined heating/hot water system for a vehicle may be provided in which only one source of energy has to be used.

The object of the invention is to provide a combined heating/hot water system for a vehicle which is safe in operation, has a high degree of energy efficiency and offers comfortable handling by the user.

The object is achieved by the features of the independent claims. Advantageous developments of the invention are characterized in the sub-claims.

According to a first feature, the invention is characterized by a combined heating/hot water system for a vehicle comprising an air heating device, at least one air duct, by means of which the air heating device is coupled by air to an interior of the vehicle to be heated, a fan by means of which air heated in the air heating device may be introduced into the interior of the vehicle to be heated, a hot water reservoir arranged in a recess of the air heating device, a first pipe duct by means of which the hot water reservoir is hydraulically coupled to a tap arranged in the vehicle, and a second pipe duct by means of which the hot water reservoir is hydraulically coupled to a water tank, at least one of the pipe ducts being arranged in one of the air ducts.

Firstly a temperature control of the at least one pipe duct, which is arranged in the at least one air duct, may be achieved thereby. This is particularly advantageous as, generally, when the combined heating/hot water system is out of operation the temperature of the water in the pipe ducts of the hot water system returns to ambient temperature. By means of the arrangement of the pipe duct in the at least one air duct it is possible to prevent this, as the pipe duct in this case may be flushed with temperature-controlled air. Moreover, a space-saving design of the combination of the air duct and pipe duct is possible.

In a preferred embodiment of the invention, the first air duct is arranged downstream of the air heating device and upstream of the interior of the vehicle to be heated and at least one of the pipe ducts is arranged in the first air duct. Thus it is possible to control the temperature of the pipe duct arranged in the air duct by means of heat from the air heating device. This is particularly advantageous if the air heating device is a low temperature heating device, as then an adaptation of the temperature of the at least one pipe duct to the temperature of the air heated by the air heating device is possible in a particularly simple manner. If the combined heating/hot water system is out of operation, depending on the arrangement of the combined heating/hot water system, by creating a convection flow between the combined heating/hot water system and the interior of the vehicle to be heated, the at least one pipe duct may therefore be flushed with warm air and thus temperature-controlled.

In a further particularly preferred embodiment of the invention, the second air duct is arranged upstream of the air heating device and downstream of the interior of the vehicle to be heated and at least one of the pipe ducts is arranged in the second air duct. This allows a particularly even temperature control of the at least one pipe duct by heat from the interior of the vehicle to be heated. Heat from the interior of the vehicle to be heated may thus flow around the at least one pipe duct and control the temperature of said pipe duct. If the combined heating/hot water system is out of operation, in this embodiment it is also possible for a convection flow to be created between the combined heating/hot water system and the interior of the vehicle to be heated so that the at least one pipe duct is flushed with hot air and thus may be temperature-controlled.

In a further preferred embodiment of the invention, the air heating device comprises a heating device which may be operated by a liquid fuel. This is particularly advantageous, as the combined heating/hot water system in this case may be operated by the fuel, which is also used as fuel for the vehicle, for example gasoline or diesel fuel. It is thus possible to use the arrangement of the at least one pipe duct in the air ducts for heating/hot water systems, which are operated with gasoline or diesel fuel.

According to a second feature, the invention is characterized by a vehicle with a combined heating/hot water system which is arranged on an outer face of the vehicle. Thus considerable scope for the design of the combined heating/hot water system is possible, in particular with regard to its size and shape. Moreover, more space for the occupants of the vehicle may be provided in the interior of the vehicle to be heated. Preferably, the combined heating/hot water system is arranged under the vehicle or on the vehicle. It is thus possible that a convection flow is created between the combined heating/hot water system and the interior of the vehicle to be heated and thus hot air flows around the at least one pipe duct arranged in the at least one air duct and is temperature-controlled.

Figure 2:
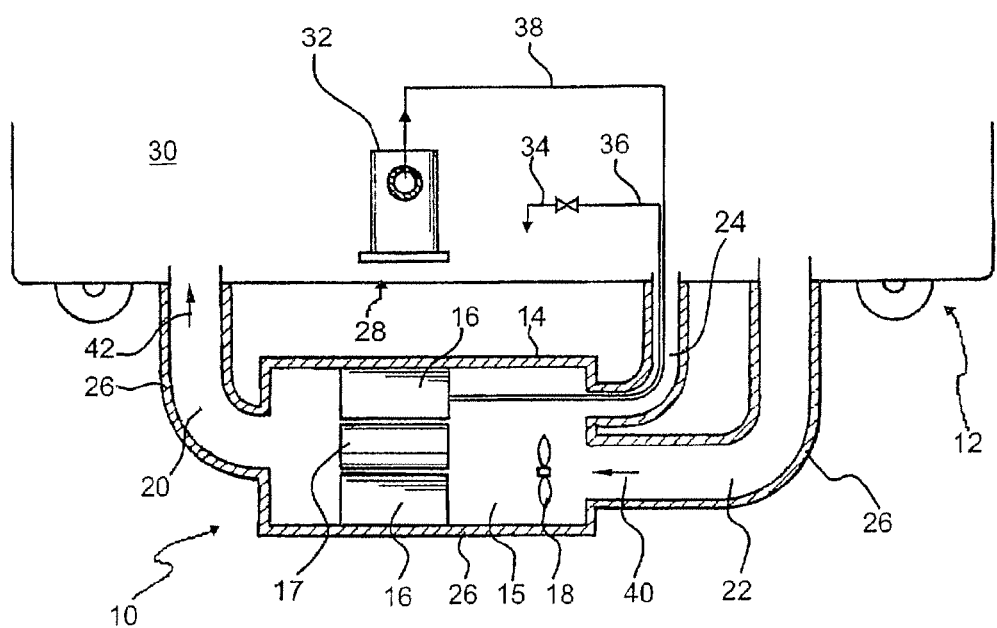
Figure 3:
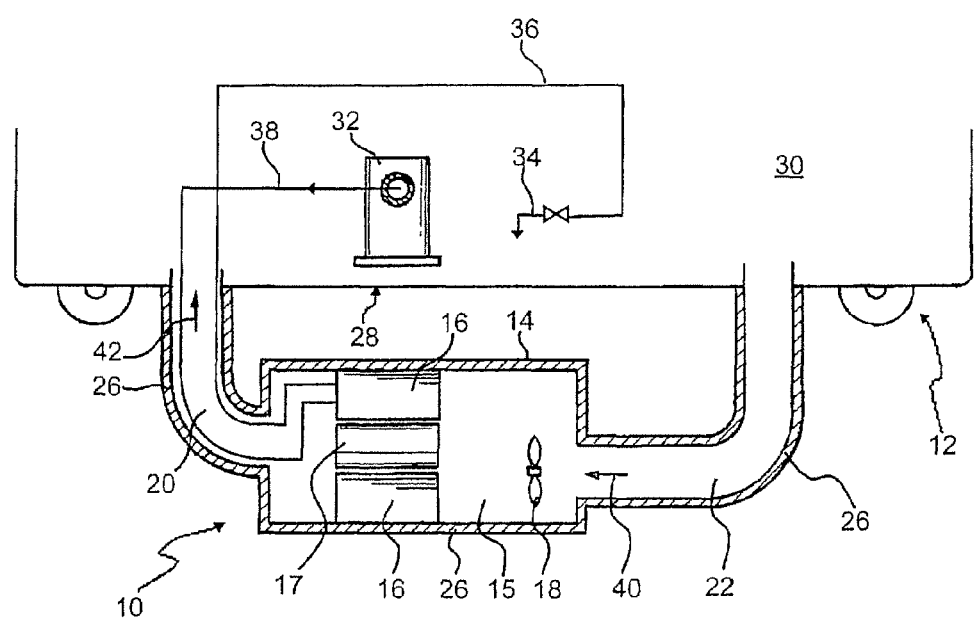

Embodiments of the invention are described hereinafter with reference to the schematic drawings, in which:

FIG. 1 shows a schematic view of a first embodiment of a combined heating/hot water system for a vehicle, FIG. 2 shows a schematic view of a second embodiment of the combined heating/hot water system for a vehicle, and FIG. 3 shows a schematic view of a third embodiment of the combined heating/hot water system for a vehicle.

Elements of the same construction or function are provided with the same reference numerals in all the figures.

FIG. 1 shows a schematic view of a first embodiment of a combined heating/hot water system 10 for a vehicle 12. The combined heating/hot water system 10 has an air heating device 14, a first air duct 20 and a second air duct 22, by means of which the air heating device 14 is coupled by air to the vehicle 12, in particular an interior 30 of the vehicle 12 to be heated. A hot water reservoir 16, a heating device 17 and a fan 18 are arranged in a recess 15 of the air heating device 14. The hot water reservoir 16 is used for storing hot water for use in the vehicle 12.

The heating device 17 may be an electrical heating device or a heating device for burning fossil fuels, in particular gaseous or liquid fuels. In particular, the heating device 17 may be operated by liquid fuels, which are already used as motor fuel for driving the vehicle 12, such as for example gasoline or diesel fuel.

The fan 18 arranged in the air heating device 14 may be arranged in the flow direction upstream or downstream of the heating device 17. The fan 18 may also be arranged outside the air heating device 14, for example in the interior 30 of the vehicle 12 to be heated.

The first air duct 20, the second air duct 22 and the air heating device 14 are provided with a heat insulating layer 26 through which the heat losses of the air heating device 14, as well as the first air duct 20 and the second air duct 22 may be reduced. The heat insulating layer 26 may also be arranged only in partial regions of the first air duct 20, the second air duct 22 and the air heating device 14.

A water tank 32 is arranged in the vehicle 12. The water tank 32 preferably serves for providing water for domestic use. The water tank 32 may also be arranged outside the interior 30 of the vehicle 12 to be heated or outside the vehicle 12. In the vehicle 12 a tap 34 is further arranged via which cold water or preferably water for domestic use heated by the air heating device 14 may be removed from the water tank 32. The tap 34 is preferably arranged in the interior 30 of the vehicle 12 to be heated. It may, however, also be arranged at other points in the vehicle 12.

By means of a first pipe duct 36, the hot water reservoir 16 is hydraulically coupled to the tap 34 arranged in the vehicle 12. A second pipe duct 38 produces a hydraulic coupling between the hot water reservoir 16 and the water tank 32. The pipe ducts 36, 38 are arranged in the second air duct 22. In the embodiment of the invention shown here, the air heating device 14 is arranged on an outer face 28 of the vehicle 12. It may, however, also alternatively be arranged in the vehicle 12, in particular in the interior 30 of the vehicle 12 to be heated.

Hereinafter the mode of operation of the first embodiment of the combined heating/hot water system 10 for a vehicle 12 is to be described in detail.

During operation of the air heating device 14, air from the interior 30 of the vehicle 12 is introduced by means of the fan 18 in a flow direction 40 into the air heating device 14. The air flows through the heating device 17, said air being heated and blown in a flow direction 42 via the first air duct into the interior 30 of the vehicle 12 to be heated. By means of the heating device 17, the hot water reservoir 16 is heated further.

If no heat is required for heating the interior 30 of the vehicle 12 to be heated, as for example in summer, the heating device 17 may also be used solely to heat up the hot water reservoir 16. The air heating device 14 may in this case be operated in outside air mode, outside air being sucked in from the surroundings by means of the fan 18 via flaps, not shown, and being able to be discharged again into the surroundings.

If hot water is drawn from the tap 34, fresh water flows from the water tank 32 into the hot water reservoir 16, where it may be heated by the air heating device 14. As, during operation of the air heating device 14, air from the interior 30 of the vehicle 12 to be heated is continuously supplied via the second air duct 22 into the air heating device 14, the temperature of the pipe ducts 36, 38 which convey water, may be maintained at least at a temperature which is close to the temperature of the interior 30 of the vehicle 12 to be heated.

If the air heating device 14 is out of operation, by coupling the interior 30 to be heated with the recess 15 of the air heating device 14 by air, it is ensured that similar temperatures prevail in the interior 30 to be heated, in the recess 15 of the air heating device 14, in the first air duct 20 and in the second air duct 22, so that also in this operating state of the air heating device 14, the pipe ducts 36, 38 may be maintained approximately at the temperature of the interior 30 of the vehicle 12. This is particularly advantageous, as in this case it may be prevented that the temperature of the water for domestic use in the pipe ducts 36, 38, even in colder seasons, falls too sharply or even, for example in winter, that the water for domestic use freezes in the pipe ducts 36, 38. This applies, in particular, when the air heating device 14 is only out of operation for a relatively short time period i.e. half a day or an entire day.

In FIG. 2, a second embodiment of the heating/hot water system 10 for a vehicle 12 is shown. It differs from the first embodiment in that between the recess 15 of the air heating device 14 and the interior 30 of the vehicle 12 to be heated, a third air duct 24 is arranged, the pipe ducts 36, 38 being arranged in the third air duct 24. Air does not actively flow through the third air duct 24 i.e. by means of a fan.

The arrangement of the pipe ducts 36, 38 in the third air duct 24 is particularly advantageous, as in such an arrangement, even in the case that an airflow in the first air duct 20 and the second air duct 22 is interrupted, for example by closing air flaps, not shown, in the first air duct 20 or in the second air duct 22, hot air may flow past the pipe ducts 36 and 38 and may control the temperature of said pipe ducts. If the air heating device 14, for example, is arranged below the interior 30 of the vehicle 12, discharged heat from the hot water reservoir 16 via the recess 15 of the air heating device 14 may pass by a convective flow via the third air duct 24 past the pipe ducts 36 and 38 into the interior 30 of the vehicle 12. Thus it may be achieved that the temperature of the pipe ducts 36, 38 may be controlled by the discharged heat of the hot water reservoir 16. With the arrangement of the air heating device 14, for example, above the interior 30 of the vehicle 12, a convection flow may be formed from the interior 30 of the vehicle 12 to be heated to the recess 15 of the air heating device 14. Thus the temperature of the pipe ducts 36, 38 may be controlled by the heat from the interior 30 of the vehicle 12.

In the third embodiment shown in FIG. 3 of the combined heating/hot water system 10 for a vehicle 12, the first pipe duct 36 and the second pipe duct 38 are arranged in the first air duct 20 downstream of the air heating device 14 and upstream of the interior 30 of the vehicle 12 to be heated.

During operation of the air heating device 14 by means of the fan 18, air is introduced in the flow direction 40 from the interior 30 of the vehicle 12 to be heated into the recess 15 of the air heating device 14. The air flows through the heating device 17 and is heated. The heated air finally flows via the first air duct 20 in the flow direction 42 into the interior 30 of the vehicle 12 to be heated. The temperature of the pipe ducts 36 and 38 arranged in the first air duct 20 is controlled by means of the hot air flow emerging from the heating device 17. The arrangement of the pipe ducts 36 and 38 in the first air duct 20 downstream of the air heating device 14 and upstream of the interior 30 of the vehicle 12 to be heated is particularly suitable for low temperature heating systems, i.e. in particular when the temperatures of the air after leaving the air heating device 14 are below 100 degrees Celsius, so that the temperature of the water for domestic use in the pipe ducts 36 and 38 may not be greater than the boiling point of water.

It is understood that, depending on requirements, combined heating/hot water systems 10, in which only one pipe duct 36, 38 is arranged in one of the air ducts 20, 22, 24, are also encompassed by the invention. Thus, for example, only the first pipe duct 38, with which the hot water reservoir 16 is hydraulically coupled to a tap 34 arranged in the vehicle 12, may be arranged in one of the air ducts 20, 22, 24. Alternatively, only the second pipe duct 36, with which the hot water reservoir 16 is hydraulically coupled to a water tank 32, may be arranged in one of the air ducts 20, 22, 24. The respective other pipe ducts 36, 38 may in these cases, for example, be guided directly from the hot water reservoir 16 respectively without a guide mechanism through the air ducts 20, 22, 24 to the tap 34 or to the water tank 32.

The invention claimed is:

1. A combined heating/hot water system for a vehicle, comprising:
    an air heating device,
    at least one air duct by means of which the air heating device is coupled by air to an interior of the vehicle to be heated,
    a fan for introduction of air into the air heating device and by means of which air heated in the air heating device is introduced into the interior of the vehicle to be heated,
    a hot water reservoir arranged in a recess of the air heating device,
    a first pipe duct by means of which the hot water reservoir is hydraulically coupled to a tap arranged in the vehicle, and
    a second pipe duct by means of which the hot water reservoir is hydraulically coupled to a water tank,
    at least one of the first and second pipe ducts being arranged in one of the air ducts.

2. The combined heating/hot water system of claim 1, characterized in that a first air duct is arranged downstream of the air heating device and upstream of the interior of the vehicle to be heated, and in that at least one of the pipe ducts is arranged in the first air duct.

3. The combined heating/hot water system of claim 1, characterized in that a second air duct is arranged upstream of the air heating device and downstream of the interior of the vehicle to be heated, and in that at least one of the pipe ducts is arranged in the second air duct.

4. The combined heating/hot water system of claim 1, characterized in that the air heating device comprises a heating device which may be operated by a liquid fuel.

5. The vehicle comprising a combined heating/hot water system of claim 1, characterized in that the combined heating/hot water system is exterior to an outer face of a vehicle interior.

6. The system of claim 5, wherein the air heating device has a heat insulating layer.

7. The system of claim 6, wherein each of a first air duct and a second air duct has a heat insulating layer.

* * * * *